(12) United States Patent
Levesque et al.

(10) Patent No.: US 9,898,904 B1
(45) Date of Patent: Feb. 20, 2018

(54) SELECTIVE CONTROL OF AN ELECTRIC FIELD TO DELIVER A TOUCHLESS HAPTIC EFFECT

(71) Applicant: IMMERSION CORPORATION, San Jose, CA (US)

(72) Inventors: Vincent Levesque, San Jose, CA (US); Vahid Khoshkava, San Jose, CA (US)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 15/239,464

(22) Filed: Aug. 17, 2016

(51) Int. Cl.
*G08B 6/00* (2006.01)
*G06F 3/01* (2006.01)

(52) U.S. Cl.
CPC ............. *G08B 6/00* (2013.01); *G06F 3/016* (2013.01)

(58) Field of Classification Search
CPC ....................................................... G08B 6/00
See application file for complete search history.

(56) References Cited

U.S. PATENT DOCUMENTS

| | | | |
|---|---|---|---|
| 6,924,787 B2 | 8/2005 | Kramer et al. |
| 7,196,688 B2 | 3/2007 | Schena |
| 7,339,572 B2 | 3/2008 | Schena |
| 7,511,706 B2 | 3/2009 | Schena |
| 7,561,141 B2 | 7/2009 | Shahoian et al. |
| 7,679,611 B2 | 3/2010 | Schena |
| 8,004,492 B2 | 8/2011 | Kramer et al. |
| 8,174,372 B2 | 5/2012 | da Costa |
| 8,780,053 B2 | 7/2014 | Colgate et al. |
| 8,791,902 B2 | 7/2014 | Colgate et al. |
| 8,836,664 B2 | 9/2014 | Colgate et al. |
| 8,976,501 B2 | 3/2015 | Smoot et al. |
| 2007/0236450 A1 | 10/2007 | Colgate et al. |
| 2008/0088580 A1 | 4/2008 | Poupyrev et al. |
| 2008/0303782 A1 | 12/2008 | Grant et al. |
| 2009/0128503 A1 | 5/2009 | Grant et al. |
| 2009/0250267 A1 | 10/2009 | Heubel et al. |
| 2009/0284485 A1 | 11/2009 | Colgate et al. |
| 2009/0322496 A1 | 12/2009 | da Costa |
| 2010/0085169 A1 | 4/2010 | Poupyrev et al. |
| 2010/0108408 A1 | 5/2010 | Colgate et al. |
| 2010/0141407 A1 | 6/2010 | Heubel et al. |
| 2010/0231367 A1 | 9/2010 | Cruz-Hernandez et al. |
| 2010/0231508 A1 | 9/2010 | Cruz-Hernandez et al. |
| 2010/0231539 A1 | 9/2010 | Cruz-Hernandez et al. |

(Continued)

OTHER PUBLICATIONS

Strategic Polymer Sciences, Inc.—EMP Technolgy, "Revolutionary Electro Mechanical Polymer Actuators", http://www.strategicpolymers.com/technology/, downloaded on Apr. 11, 2013, 2 pages.

*Primary Examiner* — Curtis Odom
(74) *Attorney, Agent, or Firm* — Merchant & Gould P.C.

(57) ABSTRACT

A haptic system includes a structure having a conductive layer and a reactive layer. The conductive layer is coupled to a power source and the reactive layer is coupled to a switch having a first state and a second state. The power source enables the conductive layer to generate a charge. The first state of the switch operates the reactive layer to block the establishment of a tissue-stimulating electric field. The second state of the switch operates the reactive layer to enable the establishment of a tissue-stimulating electric field to generate a touchless haptic effect.

8 Claims, 5 Drawing Sheets

(56) References Cited

U.S. PATENT DOCUMENTS

| | | |
|---|---|---|
| 2010/0231540 A1 | 9/2010 | Cruz-Hernandez et al. |
| 2010/0231550 A1 | 9/2010 | Cruz-Hernandez |
| 2010/0234541 A1 | 9/2010 | Cruz-Hernandez et al. |
| 2010/0283727 A1 | 11/2010 | Jiang et al. |
| 2010/0283731 A1 | 11/2010 | Grant et al. |
| 2010/0309142 A1 | 12/2010 | Cruz-Hernandez et al. |
| 2011/0260988 A1 | 10/2011 | Colgate et al. |
| 2012/0133494 A1 | 5/2012 | Cruz-Hernandez et al. |
| 2014/0139327 A1 | 5/2014 | Bau et al. |
| 2014/0160063 A1 | 6/2014 | Yairi et al. |
| 2014/0160064 A1 | 6/2014 | Yairi et al. |
| 2014/0191973 A1 | 7/2014 | Zellers et al. |
| 2014/0285424 A1 | 9/2014 | Yairi et al. |
| 2014/0347323 A1 | 11/2014 | Colgate et al. |
| 2014/0375580 A1 | 12/2014 | Peshkin et al. |
| 2015/0067103 A1 | 3/2015 | Jiang et al. |
| 2015/0316986 A1* | 11/2015 | Xue ........................ G06F 3/041 345/173 |

* cited by examiner

US 9,898,904 B1

SELECTIVE CONTROL OF AN ELECTRIC FIELD TO DELIVER A TOUCHLESS HAPTIC EFFECT

TECHNICAL FIELD

This patent document relates to haptic effects and, more particularly, to selective control of an electric field to deliver a touchless haptic effect.

BACKGROUND

Haptic effects are used to enhance the interaction of an individual with an electronic device. Haptic effects enable the user to experience a touch sensation through the device, which is typically generated by an actuator embedded in the device. Recent innovations have illustrated the ability to deliver a touchless haptic effect by establishing a capacitive coupling, and a resultant tissue-stimulating electric field, between a charged electrode and the electrically conductive tissues of a human. A control signal and high voltage amplifier are typically required for each electrode from which a touchless haptic effect is desired. However, high voltage, e.g., 100-2000 volts or more, electronic components present an expensive, bulky and difficult sourcing obstacle to wide spread implementation of haptic effects.

SUMMARY

This patent document relates to selective control of an electric field to deliver a touchless haptic effect.

In one aspect, a haptic system includes a structure having a conductive layer and a reactive layer. The conductive layer is coupled to a power source and the reactive layer is coupled to a switch having a first state and a second state. The power source enables the conductive layer to generate a charge. The first state of the switch operates the reactive layer to block the establishment of a tissue-stimulating electric field. The second state of the switch operates the reactive layer to enable the establishment of a tissue-stimulating electric field to generate a touchless haptic effect.

In another aspect, a haptic system comprises a plurality of layered structures where each of the layered structures includes an insulating layer, a conductive layer and a reactive layer. The conductive layer is coupled to a power source and the reactive layer is coupled to a switch having a first state and a second state. The power source enables the conductive layer to generate a charge. The first state of the switch operates the reactive layer to block the establishment of a tissue-stimulating electric field. The second state of the switch operates the reactive layer to enable the establishment of a tissue-stimulating electric field to generate a touchless haptic effect. Each of the layered structures is switched independent of the other layered structures.

In another aspect, a method for disabling and enabling the delivery of a haptic effect includes: (a) charging a conductor; and (b) switching an operation of a reactive layer between a first state and a second state. The first state of the reactive layer operates to block establishment of a tissue-stimulating electric field. The second state of the reactive layer operates to enable establishment of a tissue-stimulating electric field to generate a touchless haptic effect.

DETAILED DESCRIPTION

Figure 1:
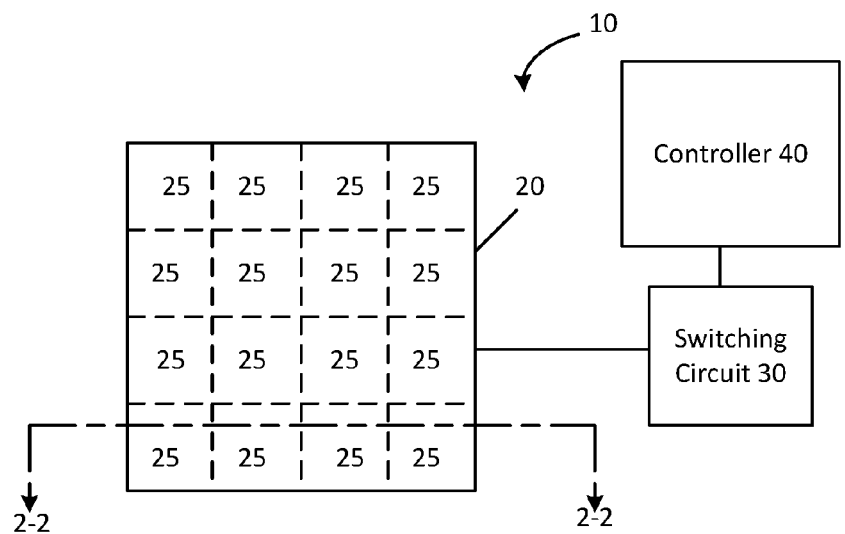
FIG. 1 is a schematic of a haptic effect system including a grid.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," "including," "has," and "having" are interchangeable and not intended to be limiting. The term "such as" also is not intended to be limiting. For example, the term "including" shall mean "including, but not limited to."

In general terms, this patent document relates to selective control of an electric field to deliver a touchless haptic effect. A touchless haptic effect is a haptic effect that is delivered because of the established electric field between a conductor and the tissues of a human or animal regardless of whether the tissues of a human or are in direct contact or near contact with a device containing the conductor, e.g., the haptic effect is delivered through the tissue not the device.

Referring to FIG. 1, a haptic effect system 10 is illustrated. The haptic effect system 10 includes a layered structure including at least a conductor and a reactive layer. In various example embodiments a plurality of the layered structures are provided, for example in a three-dimensional array or a two-dimensional grid, e.g., grid 20. The haptic effect system 10 additionally includes a switching circuit 30 and a controller 40 electrically coupled to the grid 20. The grid 20 includes a plurality of cells 25. The cells 25 can be equally sized and equidistantly spaced as shown, or can be of varying sizes and separated by varying distances. Further, the cells 25 of the grid 20 can be arranged linearly, as shown, or in any other desirable configuration. Examples of cell configurations can include, circular, triangular, square, rectangular and random.

The haptic effect system 10 may be incorporated into any type of device from which a capacitive coupling can be established between the tissues of an animal or human (e.g., the tissues in a finger, hand, foot, leg, chest, back, head, etc.) and the grid 20 via direct contact or near contact such that the individual may sense or perceive the capacitive coupling, e.g., sense a tingling, a vibration, a texture, a motion, or other type of haptic effect. Examples of devices in which the haptic effect system 10 can be incorporated include electronic devices such as desktop computers, laptop computers, tablets, smartphones, e-readers, keyboards, trackpads, medical devices, pens/stylus, gaming systems, and home appliances. Additional examples of devices in which the haptic effect system 10 can be incorporated include wearable devices such as clothing, hats, jackets, gloves, jewelry, glasses, headphones, earbuds, shoes, helmets, and athletic wear. Further examples devices in which the haptic effect system 10 can be incorporated include graspable devices such as mobile devices, game system controllers, steering wheels, gear shifters, and joysticks.

Figure 2:
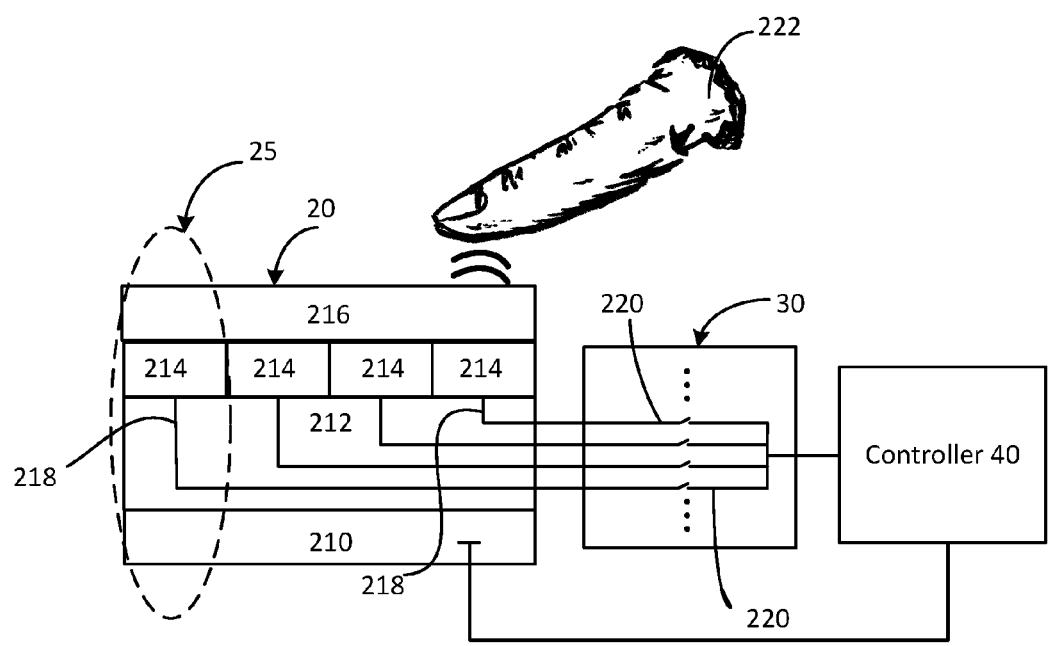
FIG. 2 is a cross-sectional schematic of the grid of FIG. 1 taken along line 2-2.

Referring to FIG. 2, an example embodiment of the grid 20 is illustrated with a cross-sectional view taken along line 2-2 of FIG. 1. The grid 20 includes the plurality of cells 25 wherein each cell 25 includes a conductor 210, a first insulator 212, a reactive layer in the form of a shielding pad 214, and a second insulator 216. The conductor 210 can comprise a continuous conductor that extends across all cells 25 of the grid 20, or can comprise a plurality of conductive portions that extend across a plurality of cells 25 or across a single cell 25, e.g. each cell 25 having its own conductor 200. The conductor 210 comprises a conductive material, for example, aluminum, copper, tin, iron, gold, silver, plasma, conductive polymers, carbon nanotubes (CNT), or indium tin oxide (ITO).

The first insulator 212 covers the conductor 210 and can be utilized in a continuous or divided configuration as described above with respect to the conductor 210. The first insulator 212 can comprise an appropriate type of dielectric, for example, glass, porcelain, plastic, polymer, fiberglass, or polyethylene terephthalate (PET). In other embodiments, the first insulator can comprise a thin film insulator such as silicon dioxide, silicon nitride, parylene or other insulators applied with thin film technology.

Each of the cells 25 is defined by a selectively controllable conductive shielding pad 214 that is placed atop the first insulator 212. The shielding pads 214 can be presented in an individual or grid/array configuration. However, regardless of the configuration, each of the shielding pads 214 is provided with an electrical lead 218. The lead 218 enables each shielding pad 214 to be individually coupled to the switching circuit 30 (described further below) and ultimately to the controller 40. Each shielding pad 214 comprises a conductive material that controls whether a haptic effect is produced at its location. In various example embodiments, the shielding pads 214 used in the grid 20 comprise a thin, conductive material, such as an aluminum film. In other example embodiments, the shielding pads 214 comprise a dense, transparent conductive electrode grid/array. In still other example embodiments, the shielding pads 214 are fabricated from alternative conductive materials such as copper, tin, iron, gold, silver, plasma, conductive polymers, carbon nanotubes (CNT), or indium tin oxide (ITO).

The second insulator 216 is provided atop one or more of the shielding pads 214. The second insulator 216 can be a shared insulator covering all or a plurality of shielding pads 214, or can comprise an insulator configured to cover a single shielding pad 214. The second insulator can comprise any appropriate type of dielectric, for example, glass, porcelain, plastic, polymer, fiberglass, nitrogen, sulfur hexafluoride or polyethylene terephthalate (PET).

The switching circuit 30 is electrically coupled to the leads 218 from each of the shielding pads 214. The switching circuit 30, which operates under direction of the controller 40, is configured to control whether each of the shielding pads 214 is connected to ground or left to float relative to ground. The actual switching within the circuit 30 can be performed by relays, transistors, or any other known manner of switching electrical connections, which is represented by switches 220. The switching circuit 30 can be peripheral, or external, to the controller 40 or can be an internal component of the controller 40.

Figure 3:
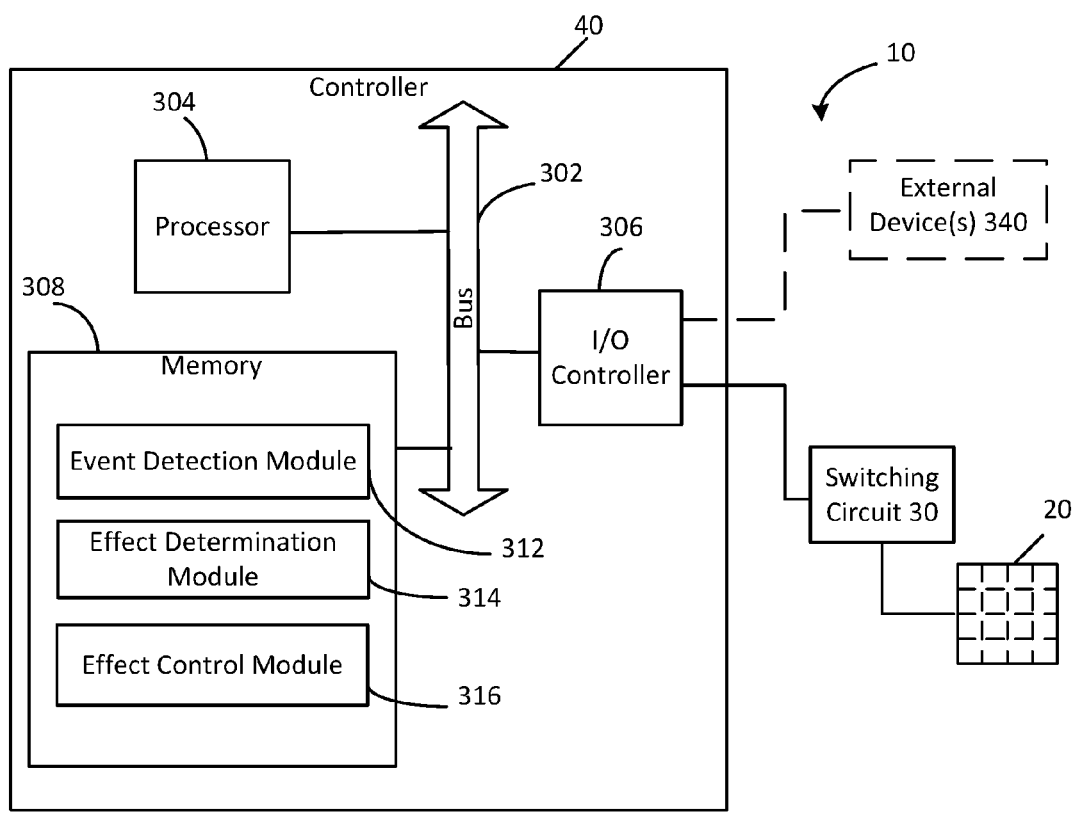
FIG. 3 is a schematic of a controller configured for use in the haptic effect system.

Referring to FIG. 3, the controller 40 generally includes a bus 302, a processor 304, an input/output (I/O) controller 306 and a memory 308. The bus 302 couples the various components of the controller 40, including the I/O controller 306 and memory 308, to the processor 304. The bus 302 typically comprises a control bus, address bus, and data bus. However, the bus 302 can be any bus or combination of busses suitable to transfer data between components in the controller 40.

The processor 304 can comprise any circuit configured to process information and can include any suitable analog or digital circuit. The processor 304 can also include a programmable circuit that executes instructions. Examples of programmable circuits include microprocessors, microcontrollers, application specific integrated circuits (ASICs), programmable gate arrays (PGAs), field programmable gate arrays (FPGAs), or any other processor or hardware suitable for executing instructions. In the various embodiments, the processor can comprise a single unit, or a combination of two or more units, with the units physically located in a single controller or in separate devices.

The I/O controller 306 comprises circuitry that monitors the operation of the controller 40 and peripheral or external devices, e.g., the switching circuit 30 if the circuit 30 is external to the controller 40. The I/O controller 306 also manages data flow between the controller 40 and peripherals or external devices 340. The external devices 340 can reside in the same device in which the haptic effect system 10 is incorporated or can be external to the device in which the ESF is incorporated. Examples of other peripheral or external devices 340 with which the I/O controller can interface include sensors, external storage devices, monitors, input devices such as keyboards, mice or pushbuttons, external computing devices, mobile devices, and transmitters/receivers.

The memory 308 can comprise volatile memory such as random access memory (RAM), read only memory (ROM), electrically erasable programmable read only memory (EEPROM), flash memory, magnetic memory, optical memory or any other suitable memory technology. The memory 308 can also comprise a combination of volatile and nonvolatile memory.

The memory 308 is configured to store a number of program modules for execution by the processor 304, including an event detection module 312, an effect determination module 314, and an effect control module 316. Each program module is a collection of data, routines, objects, calls and other instructions that perform one or more particular task. Although certain program modules are disclosed herein, the various instructions and tasks described for each module can, in various embodiments, be performed by a single program module, a different combination of modules, modules other than those disclosed herein, or modules executed by remote devices that are in communication with the controller 40.

The event detection module 312 is programmed to evaluate received event data to determine if the event data is associated with a haptic effect. The event data can comprise data generated by an event occurring in a device in which the haptic effect system 10 is incorporated; examples of such devices are provided herein. Alternatively, the event data can comprise data generated by a device or system that is separate from the device incorporating the haptic effect system 10. An event can, for example comprise, an individual input (e.g., a button press, the manipulation of a joystick, user interaction with a touch sensitive surface, tilting or orienting a user interface device). In another example, the event can comprise a system status (e.g., low battery, low memory, an incoming call), a sending of data, a receiving of data, or a program event (e.g., a game program producing the explosions, gunshots, collisions, interactions between characters, bumpy terrains).

In some example embodiments, the occurrence of an event is detected by one or more sensors, e.g. external device(s) 340. Examples of sensors include acoustical or sound sensors such as microphones; vibration sensors; chemical and particle sensors such as breathalyzers, carbon monoxide and carbon dioxide sensors, and Geiger counters; electrical and magnetic sensors such as voltage detectors or hall-effect sensors; flow sensors; navigational sensors or instruments such as GPS receivers, altimeters, gyroscopes, or accelerometers; position, proximity, and movement-related sensors such as piezoelectric materials, rangefinders, odometers, speedometers, shock detectors; imaging and other optical sensors such as charge-coupled devices (CCD), CMOS sensors, infrared sensors, and photodetectors; pressure sensors such as barometers, piezometers, and tactile sensors; force sensors such as piezoelectric sensors and strain gauges; temperature and heat sensors such as thermometers, calorimeters, thermistors, thermocouples, and pyrometers; proximity and presence sensors such as motion detectors, triangulation sensors, radars, photo cells, sonars, and hall-effect sensors; biochips; biometric sensors such as blood pressure sensors, pulse/ox sensors, blood glucose sensors, and heart monitors. Additionally, the sensors can be formed with smart materials, such as piezo-electric polymers, which in some embodiments function as both a sensor and an actuator.

Upon the event detection module 312 determining that event data is associated with a haptic effect, the effect determination module 314 determines which haptic effect to deliver through the grid 20 of the haptic effect system 10. An example technique that the determination module 314 can use to determine a haptic effect includes rules programmed to make decisions to select a haptic effect. Another example technique that can be used by the determination module 314 to select a haptic effect includes lookup tables or databases that relate the haptic effect to the event data.

Upon the effect determination module 314 determining which haptic effect to deliver, the effect control module 316 directs the activation of one or more cells 25 of the grid 20. Activation of the cells 25 enables the capacitive coupling ability of the cells 25 with the tissues, such as those of an animal or human. Those cells 25 that are selectively, individually activated are now enabled to deliver the desired touchless haptic effect. The effect control module 316 can additionally control the duration of activation of the cells 25, the order of activation of the cells 25, and the type of activation (e.g., pulse or steady state) of the cells 25.

More specifically, in operation, with reference to FIG. 2, the controller 40 directs that an alternating current be applied to the conductor 210 to establish a charge on the conductor 210. As an individual's tissue, e.g., the tissue in a finger 222 in FIG. 2, comes near or in contact with the second insulator 216, a capacitive coupling and a tissue-stimulating electric field is established between the conductor 210 and the tissue resulting in a sensation that is detectable by the individual as a touchless haptic effect. The capacitive coupling can be established with the tissue at each cell 25 in which the switching circuit 30 has isolated the shielding pad 214 and enabled the shielding pad 214 to be charged by electrostatic induction. Because each of the cells 25 is individually controllable a single cell 25 in the grid 20 can be activated, or a plurality of cells 25 can be activated simultaneously or at different times in various patterns to generate a desired touchless haptic effect.

Additionally, the capacitive coupling ability of the cell 25 and its associated electric field can be interrupted by utilizing the switching circuit 30, under direction of the controller 40, to tie the shielding pad 214 of the cell 25 to ground. In this configuration, the capacitive coupling occurs between the conductor 210 and the shielding pad 214 instead of between the conductor 210 and the tissues of an animal or human; the capacitive coupling ability of the cell 25 allowing the delivery and non-delivery of a touchless haptic effect to be controlled. In various embodiments, the grid 20 can be configured to operate with various voltage levels depending on the type of effect to be delivered, the distance of the user from the surface of the grid 20 and the insulator used in the grid/array, e.g. low voltages for dynamic effects or high voltages for static effects. For example, the voltage ranges used to charge the conductor or utilized with the shielding pads can be anywhere in the range of 70 V to 2 kV. Further, the frequency of the current delivered to the conductor can, for example, be in the range of 1 Hz to 500 Hz dependent upon the type of effect desired.

Figure 4A:
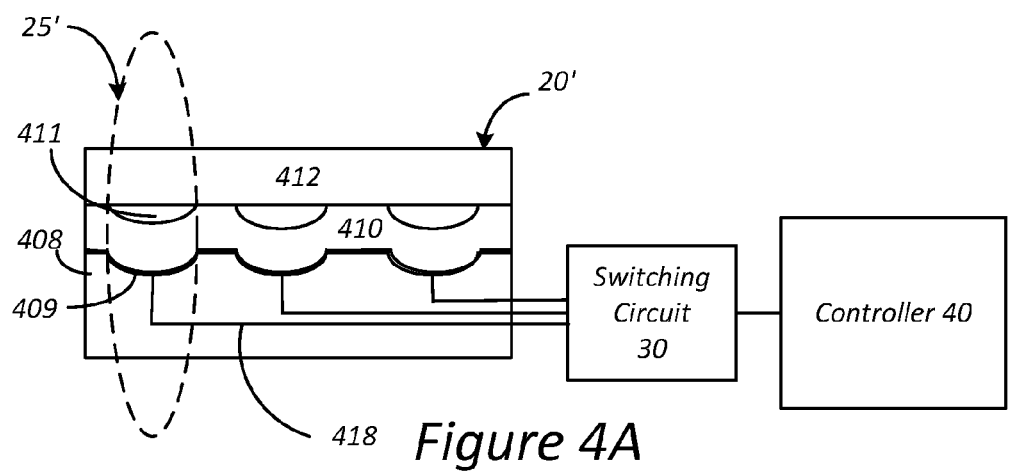
FIG. 4A is a cross-sectional schematic of an alternative embodiment of the grid of FIG. 1 taken along line 2-2 with an activated deformable layer.
Figure 4B:
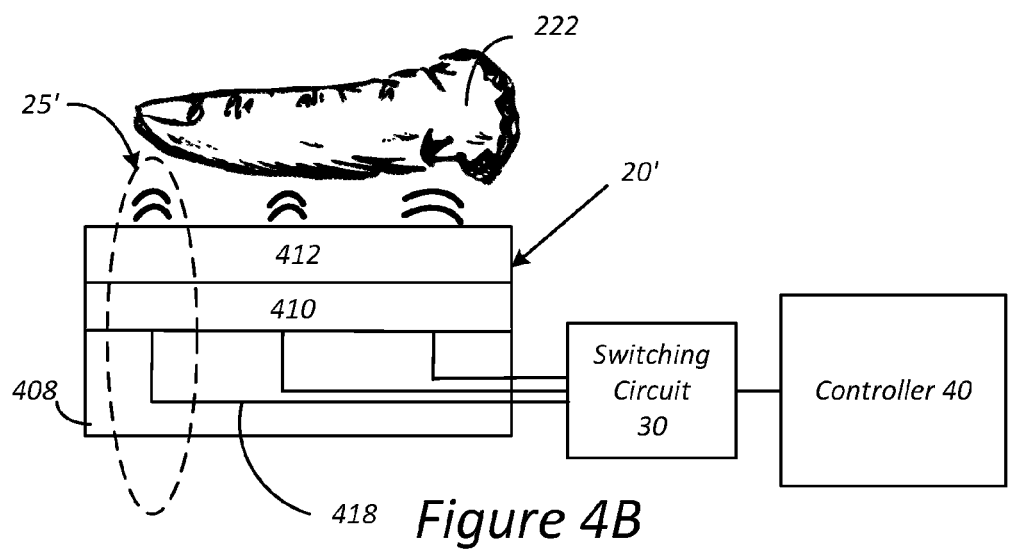
FIG. 4B is cross-sectional schematic of FIG. 4A with a de-activated deformable layer.

Referring to FIGS. 4A and 4B, a cross-sectional view of an alternative embodiment of a grid 20' is illustrated. In this embodiment, the grid 20' includes the plurality of cells 25' each of which includes a reactive layer in the form of a deformable layer 408, a conductor 410 and an insulator 412. FIG. 4A illustrates the grid 20' with an activated deformable layer 408 while FIG. 4B illustrates the grid 20' with a de-activated deformable layer 408.

More specifically, the deformable layer 408 is configured with the ability to locally change its shape or position, and defines the cell 25' by each location of deformability. In various example embodiments, the deformable layer 408 can comprise a smart material wherein the smart material within each cell 25' is selectively controllable by the controller 40 via the switching circuit 30. For example, see FIG. 4A, the controller 40 can selectively control whether the smart material in each cell 25' will deform to create a dimple 409 in the upper surface of the smart material. In various example embodiments, the deformable layer 408 of each cell 25' is provided with a lead 418, an alternative electrical coupling mechanism (e.g., an electrode), or other non-electrical coupling mechanism (e.g., an actuator), that enables the deformable layer 408 of each cell 25' to be coupled to the switching circuit 30. The switching circuit 30 enables the provision of an external stimulus to the deformable layer 408 to cause the deformation. Examples of external stimuli that can be selectively provided via the switching circuit 30 to cause deformation of the deformation layer 408 include an electrical current, stress, temperature, moisture, pH, an electric field and a magnetic field.

Examples of deformable smart materials can include smartgels, piezoelectric materials, shape-memory alloys, shape-memory polymers, magnetostrictive materials, magnetic shape-memory alloys, pH-sensitive polymers, temperature-responsive polymers, ferrofluids, photomechanical materials, dielectric elastomers, magnetocaloric materials, and thermoelectric materials. Other types of smart materials also may be used.

Referring again to FIGS. 4A and 4B, the conductor 410 can comprise a continuous conductor that extends across all cells 25' of the grid 420, or can comprise a plurality of conductive portions that extend across a plurality of cells 25' or across a single cell 25', e.g. each cell 25' having its own conductor 410. The conductor 410 can comprise a flexible conductive material that is adhered to the deformable layer 408 such that the conductor 410 follows the selective deformations of the deformable layer 408, for example, see FIG. 4A. Examples of conductive materials from which the conductor 410 can be fabricated include copper, tin, iron, gold, silver, plasma, conductive polymers, carbon nanotubes (CNT), or indium tin oxide (ITO).

The insulator 412 covers the conductor 410 and can be utilized in a continuous or divided configuration, e.g., plurality of cells 25' or single cell 25', as described above with respect to the conductor 410. The insulator 412 can comprise air or another type of dielectric, for example, glass, porcelain, plastic, polymer, fiberglass, nitrogen, sulfur hexafluoride or polyethylene terephthalate (PET).

The switching circuit 30 is electrically coupled to the leads 418 from the deformable layer 408 of each cell 25'. In the present embodiment, the switching circuit 30, which operates under direction of the controller 40, is configured to control whether the deformable layer 408 within a cell 25' deforms, see FIG. 4A, or maintains its non-deformed state, see FIG. 4B. As before, the actual switching within the circuit 30 can be performed by relays, transistors, or any other known manner of switching electrical connections. The switching circuit 30 can be peripheral, or external, to the controller 40 or can be an internal component of the controller 40. The controller 40 is as described above with reference to FIG. 3.

In operation, with reference to FIG. 4B, any deformation of deformable layer 408 is de-activated and an alternating current is applied to the conductor 410 to establish a charge on the conductor 410. As an individual's tissue, e.g., the tissue in a finger 222, comes near or in contact with the insulator 412, a capacitive coupling is established between the conductor 410 and the tissue resulting in a tissue-stimulating electric field providing a sensation that is detectable by the individual as a touchless haptic effect. The capacitive coupling can be established with the individual's tissue at each cell 25' in which the switching circuit 30 has enabled the deformable layer 408 (along with the conductor 410 adhered to the deformable layer) to remain in its non-deformed state.

In operation, with regard to FIG. 4A, the switching circuit 30 activates the deformable layer 408 to deform, e.g. presenting a dimple in the deformable layer 408 surface that is followed by the conductor 410, such that a gap 411 is created between the conductor 410 and the insulator 412. The gap 411 operates to reduce the capacitive coupling ability of the conductor 410 with the individual, and, accordingly, the capacitive coupling between the conductor 410 and the individual's tissue is interrupted. As the deformable layer 408 of each cell 25' is individually tied to the switching circuit 30, the ability for each cell 25' to deliver a touchless haptic effect is selectively controllable by the switching circuit 30, operating under control of the controller 40.

Figure 5:
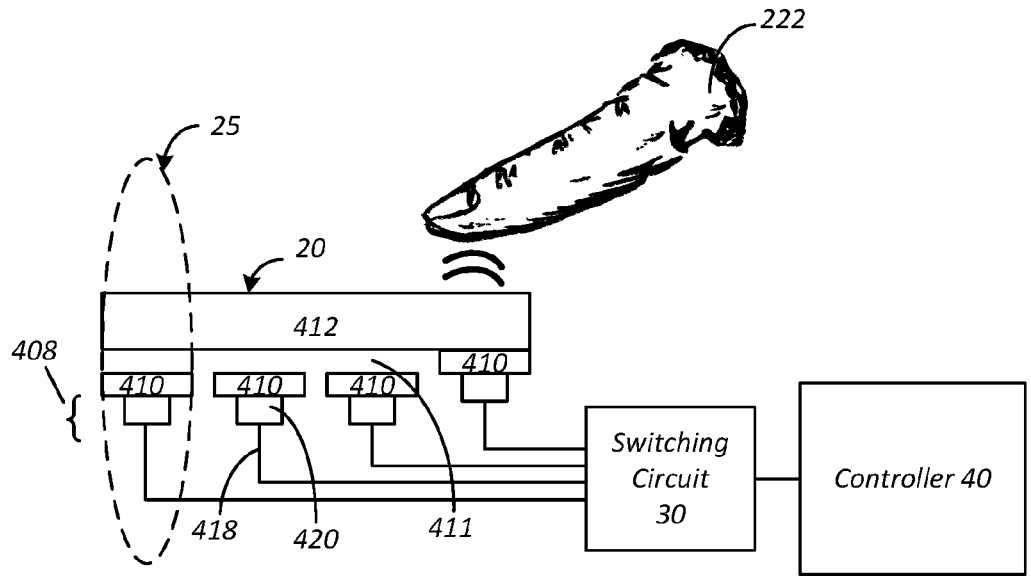
FIG. 5 is a cross-sectional schematic of an alternative embodiment of the grid of FIG. 1 taken along line 2-2.

In another example embodiment of the grid 20, see FIG. 5, the deformable layer 408 can comprise a layer of miniature actuators 420 (e.g., miniature DC motors) each incorporating the conductor 410. In this embodiment, the miniature actuator 420 defines each cell 25. The haptic effect from each cell 25 is selectively controllable by the switching circuit 30, operating under direction of the controller 40, by deforming, e.g., moving the position of the miniature actuator 420 and corresponding conductor 410, towards or away from the insulator 412. With an alternating current supplied to the conductor(s) 410, a capacitive coupling and a tissue-stimulating electric field may be established between an individual's tissue, e.g., the tissue in a finger 222, and the conductor 410 when the miniature actuator 420 is enabled by the switching circuit 30 to place the conductor 410 proximate the insulator 412. With the capacitive coupling established between the individual and the conductor, a touchless haptic effect is then detectable by the individual. Moving the miniature actuator 420, and corresponding conductor 410, away from the insulator 412 to leave a gap 411 results in an interruption of the capacitive coupling ability of the conductor 410 and an interruption in the individual detecting a touchless haptic effect. In various example embodiments, a gap 411 of around 1 mm between the conductor 410 and the insulator 412 can be sufficient to eliminate the touchless haptic effect.

Figure 6:
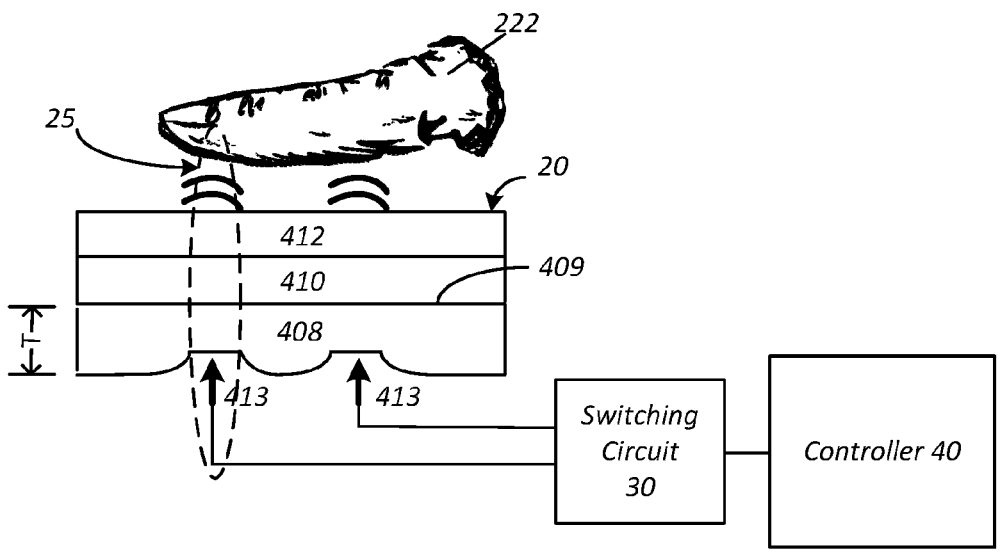
FIG. 6 is a cross-sectional schematic of an alternative embodiment of the grid of FIG. 1 taken along line 2-2.

In still another example embodiment of the grid 20, see FIG. 6, the deformable layer 408 is initially presented in a layer of sufficient thickness, T, such that the capacitive coupling ability, and the resulting haptic effects, between an individual and the conductor 410 is interrupted. To enable the capacitive coupling ability of the conductor 410 with the individual, the deformable layer 408 is subjected to a force, which in this example is in the form of a compression, from underneath leaving the top surface 409 of the deformable layer 408, proximate the conductor 410, in a non-deformed state. The compression, represented by arrows 413 can occur through properties of the deformable layer 408, e.g., the deformable layer 408 comprises a smart material that executes its own compression upon application of an external stimulus. The external stimulus is selectively applied to the cells 25 of the grid using the switching circuit 30, under direction of the controller 40. Alternatively, the deformable layer 408 can be compressed by miniature actuators or by an additional layer positioned below the deformable layer 408. In still another embodiment, the additional layer is positioned between the conductor 410 and the deformable layer 408, with the additional layer configured to subject the top surface 409 to a force in a direction opposite the compression indicated by the arrows 413.

Figure 7:
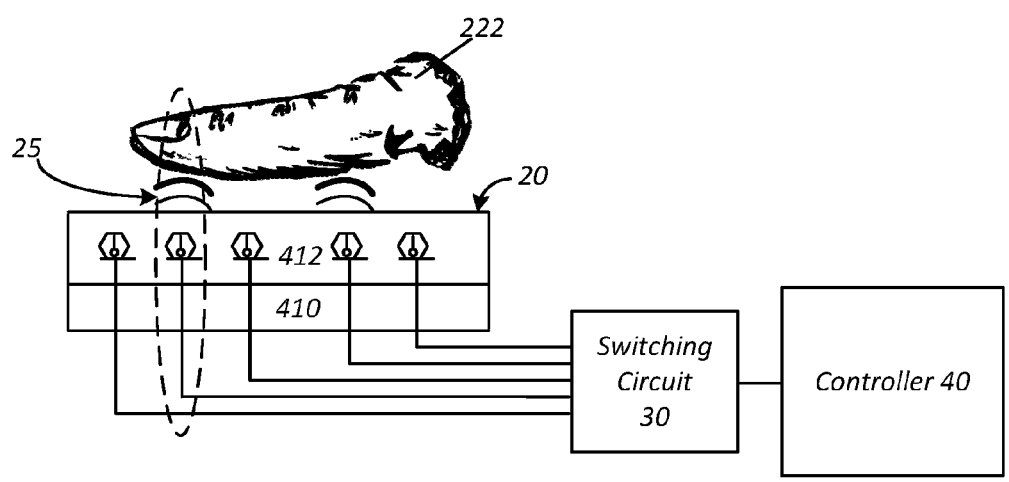
FIG. 7 is a cross-sectional schematic of an alternative embodiment of the grid of FIG. 1 taken along line 2-2.

In still another example embodiment of the grid 20, see FIG. 7, each cell 25 of the grid 20 includes a conductor 410 and an insulator 412 as the reactive layer. In the present embodiment, the dielectric property of the insulator 412 is the element of each cell 25 that is selectively controlled by the switching circuit 30, under direction of the controller 40. More specifically, the insulator 412 of each cell 25 is selectively controlled to maintain its current temperature or change its temperature, e.g., raise or lower the temperature, resulting in a change to the dielectric properties and dielectric constant of the insulator 412 within the cell 25. The change in dielectric properties can function to enable or disable the capacitive coupling ability of the cell 25 with the tissue of an individual and, accordingly, enable or disable a touchless haptic effect.

The various embodiments of haptic effect systems 10, grids 20 and cells 25 described above enable individual control of the capacitive coupling ability of each cell 25 with the tissues of an animal or human. In an one exemplary use, an electronic multi-touch pad is equipped with the haptic effect system 10 and is able to provide a touchless haptic effect at one finger pad, but not another. In another exemplary use, a wristband equipped with a haptic effect system 10 can produce the sensation of a directional flow by sequentially activating several cells 25 within the grid 20. In still another exemplary use, an individual uses a smart watch to navigate to a new client's office. When the individual needs to turn right, a sequence of touchless haptic effects flows clockwise along the individual's wristband; the wristband incorporates an grid 20 of cells 25 each of which can be turned on or off individually. In still another exemplary use, an individual is using a tablet equipped with an grid 20. The individual is drawing on the table with their right index finger and smudging the drawing with their left index finger. The sensation the individual feels with each finger is very different and reflects the type of tool that each finger is controlling. The different sensations are possible because each finger is proximate a different cell 25 in the grid 20 and each of those cells 25 are controlled to provide a different touchless haptic effect. Numerous other uses are also possible with the haptic effect systems 10, grids 20 and cells 25.

Further, the haptic effect systems 10, grids 20 and cells 25 are configured to enable the capacitive coupling ability of each cell 25 with the animal's or human's tissues without requiring a control signal or requiring a high voltage amplifier for each of the cells 25, thereby keeping the cost and complexity of the systems 10, grids 20 and cells 25 reduced. Moreover, the ability to provide selective activation of each cell 25 via an individual connection to each cell 25, rather than using a single signal requiring multiplexors/switches to determine which cell(s) receive the signal, substantially eliminates the need for using high-voltage electronic components (e.g., able to handle 100 to 2000 V) that are expensive, bulky and difficult to source.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. A haptic system comprising:
a structure having a conductive layer coupled to a power source and a reactive layer coupled to a switch having a first state and a second state, the reactive layer comprising a deformable layer coupled to the conductive layer;
wherein the power source enables the conductive layer to generate a charge on the conductive layer;
wherein the first state of the switch operates the reactive layer to block the establishment of a tissue-stimulating electric field;
wherein the second state of the switch operates the reactive layer to enable the establishment of a tissue-stimulating electric field to generate a touchless haptic effect; and
wherein the structure further comprises an insulating layer and wherein the first state of the switch blocks the tissue-stimulating electric field of the charged conductive layer by stimulating the deformable layer to draw the charged conductive layer away from the insulating layer, and wherein the second state of the switch enables the tissue-stimulating electric field of the charged conductive layer by non-stimulation of the deformable layer to place the charged conductive layer proximate the insulating layer.

2. The haptic system of claim 1, wherein the reactive layer comprises a second conductive layer.

3. The haptic system of claim 2, wherein the first state of the switch blocks the tissue-stimulating electric field of the charged conductive layer by disconnecting the second conductive layer from ground and the second state of the switch enables the tissue-stimulating electric field of the charged conductive layer by connecting the second conductive layer to ground.

4. The haptic system of claim 1, wherein the stimulation of the deformable layer is generated by an electrical current, stress, temperature, moisture, pH, an electric field or a magnetic field.

5. A haptic system comprising:
a structure having a conductive layer coupled to a power source and a reactive layer coupled to a switch having a first state and a second state, the reactive layer comprising a deformable layer coupled to the conductive layer, and the deformable layer comprises an actuator coupled to the conductive layer;
wherein the power source enables the conductive layer to generate a charge on the conductive layer;
wherein the first state of the switch operates the reactive layer to block the establishment of a tissue-stimulating electric field;
wherein the second state of the switch operates the reactive layer to enable the establishment of a tissue-stimulating electric field to generate a touchless haptic effect; and
wherein the structure further comprise an insulating layer and wherein the first state of the switch blocks the tissue-stimulating electric field of the charged conductive layer by moving the charged conductive layer away from the insulating layer and wherein the second state of the switch enables the tissue-stimulating electric field of the charged conductive layer by moving the conductive layer proximate the insulating layer.

6. The haptic system of claim 1, wherein the first state of the switch blocks the tissue-stimulating electric field of the charged conductive layer through an absence of a force on the deformable layer and wherein the second state of the switch enables the tissue-stimulating electric field of the charged conductive layer through application of a force at the deformable layer.

7. The haptic system of claim 6, wherein the application of a force at the deformable layer occurs through application of an external stimulus to the deformable layer or through actuator compression of the deformable layer.

8. A haptic system comprising:
a structure having a conductive layer coupled to a power source and a reactive layer coupled to a switch having a first state and a second state;
wherein the power source enables the conductive layer to generate a charge on the conductive layer;
wherein the first state of the switch operates the reactive layer to block the establishment of a tissue-stimulating electric field;
wherein the second state of the switch operates the reactive layer to enable the establishment of a tissue-stimulating electric field to generate a touchless haptic effect; and
wherein the reactive layer comprises an insulating layer and wherein the first state of the switch blocks the tissue-stimulating electric field of the charged conductive layer by adjusting a dielectric property of the insulating layer to a first value and wherein the second state of the switch enables the tissue-stimulating electric field of the charged conductive layer by adjusting the dielectric property of the insulating layer to a second value that is different from the first value.

* * * * *